United States Patent [19]
Beardsley et al.

[11] Patent Number: 5,461,720
[45] Date of Patent: Oct. 24, 1995

[54] SYSTEM FOR INCREASING THE EFFICIENCY OF COMMUNICATIONS BETWEEN CONTROLLER AND PLURALITY OF HOST COMPUTERS BY PROHIBITING RETRANSMISSION THE SAME MESSAGE FOR PREDETERMINED PERIOD OF TIME

[75] Inventors: Brent C. Beardsley; Adalberto G. Yanes, both of Tucson, Ariz.

[73] Assignee: International Business Machines Corporation, Armonk, N.Y.

[21] Appl. No.: 949,671

[22] Filed: Sep. 23, 1992

[51] Int. Cl.⁶ .................................................. G06F 15/02
[52] U.S. Cl. .................... 395/439; 395/474; 395/182.14; 395/183.19; 395/894; 364/230.2; 364/242; 364/242.1; 364/DIG. 1
[58] Field of Search .................................. 395/275, 725, 395/550; 364/230.2, 242, 242.1; 371/16.3

[56] References Cited

U.S. PATENT DOCUMENTS

| | | | |
|---|---|---|---|
| 4,916,605 | 4/1990 | Beardsley et al. | 364/200 |
| 4,970,640 | 11/1990 | Beardsley et al. | 364/200 |
| 5,226,150 | 7/1993 | Callander et al. | 395/575 |
| 5,230,048 | 7/1993 | Moy | 395/600 |
| 5,280,628 | 1/1994 | Nakayama | 395/725 |
| 5,301,312 | 4/1994 | Christopher, Jr. et al. | 395/575 |
| 5,317,747 | 5/1994 | Mochida et al. | 395/725 |
| 5,363,506 | 11/1994 | Fukuoka | 395/725 |

OTHER PUBLICATIONS

Mischa Schwartz, "Telecommunication Networks", 1987, pp. 372–374.

Primary Examiner—Thomas C. Lee
Assistant Examiner—Moustafa M. Meky
Attorney, Agent, or Firm—H. St. Julian; L. Bruce Terry; Andrew J. Dillon

[57] ABSTRACT

A method and system for enhancing the efficiency of communication between multiple host computers and a storage system controller via multiple communication channels. After detecting a transmission of a specific message from the storage system controller to a selected host computer, channel data bits corresponding to that particular communication channel are set within preliminary control words which are stored in temporary storage locations. A timer circuit is coupled to the temporary storage locations and periodically resets the channel data bits. A final control word is then calculated by combining the channel data bits from all of the preliminary control words. A control circuit is then utilized to prohibit the retransmission of the specific message from the storage system controller to the selected host computer for a predetermined minimum period of time in response to the state of the channel data bits within the final control word. Communication efficiency is increased by eliminating unnecessary transmissions of a specific message.

5 Claims, 4 Drawing Sheets

SYSTEM FOR INCREASING THE EFFICIENCY OF COMMUNICATIONS BETWEEN CONTROLLER AND PLURALITY OF HOST COMPUTERS BY PROHIBITING RETRANSMISSION THE SAME MESSAGE FOR PREDETERMINED PERIOD OF TIME

BACKGROUND OF THE INVENTION

1. Technical Field

The present invention relates in general to data storage system controllers for data processing systems, and more particularly to a method and system for managing serial communication between a storage system controller and a plurality of host computer systems. Still more particularly, the present invention relates to a method and system for eliminating the retransmission of unnecessary messages within a minimum time from a storage system controller to one of a plurality of host computer systems.

2. Description of the Related Art

In large data processing systems, it is common to utilize specialized hardware and software to control input/output devices. An example of one such specialized device is the "3990 Model 3 Storage Control" available from International Business Machines Corporation. The 3990 is a storage system controller which, in part, off-loads host-processor workload by receiving input/output commands from the host computer system, translates these commands to the Direct Access Storage Device (DASD), and manages the transfer of data between the host computer and the DASD. In performing these functions, the storage system controller transmits messages, such as "requests for connection" or "Request Ins," to a plurality of host computers, each connected to the storage system controller via a communications link or logical channel.

Depending on the particular application, communications hardware and software within the storage system controller may control transmission of messages over multiple independent logical channels connecting the storage system controller to multiple host computers. The communication protocol of such logical channels is defined by the data processing system interconnection architecture, an example of which is the "IBM Enterprise Systems Connection" (ESCON).

Under ESCON architectural requirements, a message, such as a Request In, transmitted from a storage system controller to a host computer, requesting connection to a logical channel, cannot be retransmitted for at least 50 microseconds. To prevent the storage system controller from generating a message representing a request for connection (for example, in a system utilizing the 3990, a "Request In") to the same host computer within 50 microseconds of a previous request for connection, a timing device monitors and prohibits retransmission of such a message from each individual logical channel for a specified period of time, which, in this example, is 50 microseconds. Such a timing and communication control device may be implemented in either hardware or software.

In known storage system controllers having multiple serial channels, each channel utilizes a separate timing device for prohibiting the transmission of a specific message within a specified period of time. Consequently, each serial channel employs substantially similar hardware or software to implement such a timer and control function. If the timing device is implemented in hardware, the use of redundant timer circuits raises manufacturing cost, consumes more power, generates more heat, and requires more space on a circuit board. Thus, it should be obvious to one skilled in the art that a need exist for a method or system of enhancing the efficiency of communication between multiple host computers and a storage system controller by prohibiting a serial channel from generating a request for connection within a specified period of time from a previous request for connection, without utilizing redundant timer circuitry and thereby using fewer parts, consuming less power, generating less heat, and requiring less circuit board space.

SUMMARY OF THE INVENTION

It is therefore one object of the present invention to provide enhanced efficiency of communication between a plurality of host computers and a storage system controller.

It is another object of the present invention to provide a method and system for eliminating unnecessary transmissions of requests for connection from a storage system controller to a host computer.

It is yet another object of the present invention to provide a method and system for eliminating unnecessary transmissions of requests for connection from a storage system controller to a host computer utilizing a single timer and a minimal amount of hardware.

The foregoing objects are achieved as is now described. A method and system are disclosed for enhancing the efficiency of communication between multiple host computers and a storage system controller via multiple communication channels. After detecting a transmission of a specific message from the storage system controller to a selected host computer, channel data bits corresponding to that particular communication channel are set within preliminary control words which are stored in temporary storage locations. A timer circuit is coupled to the temporary storage locations and periodically resets the channel data bits. A final control word is then calculated by combining the channel data bits from all of the preliminary control words. A control circuit is then utilized to prohibit the retransmission of a specific message from the storage system controller to the selected host computer for a predetermined minimum period of time in response to the state of the channel data bits within the final control word. Communication efficiency is increased by eliminating unnecessary transmissions of a specific message.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
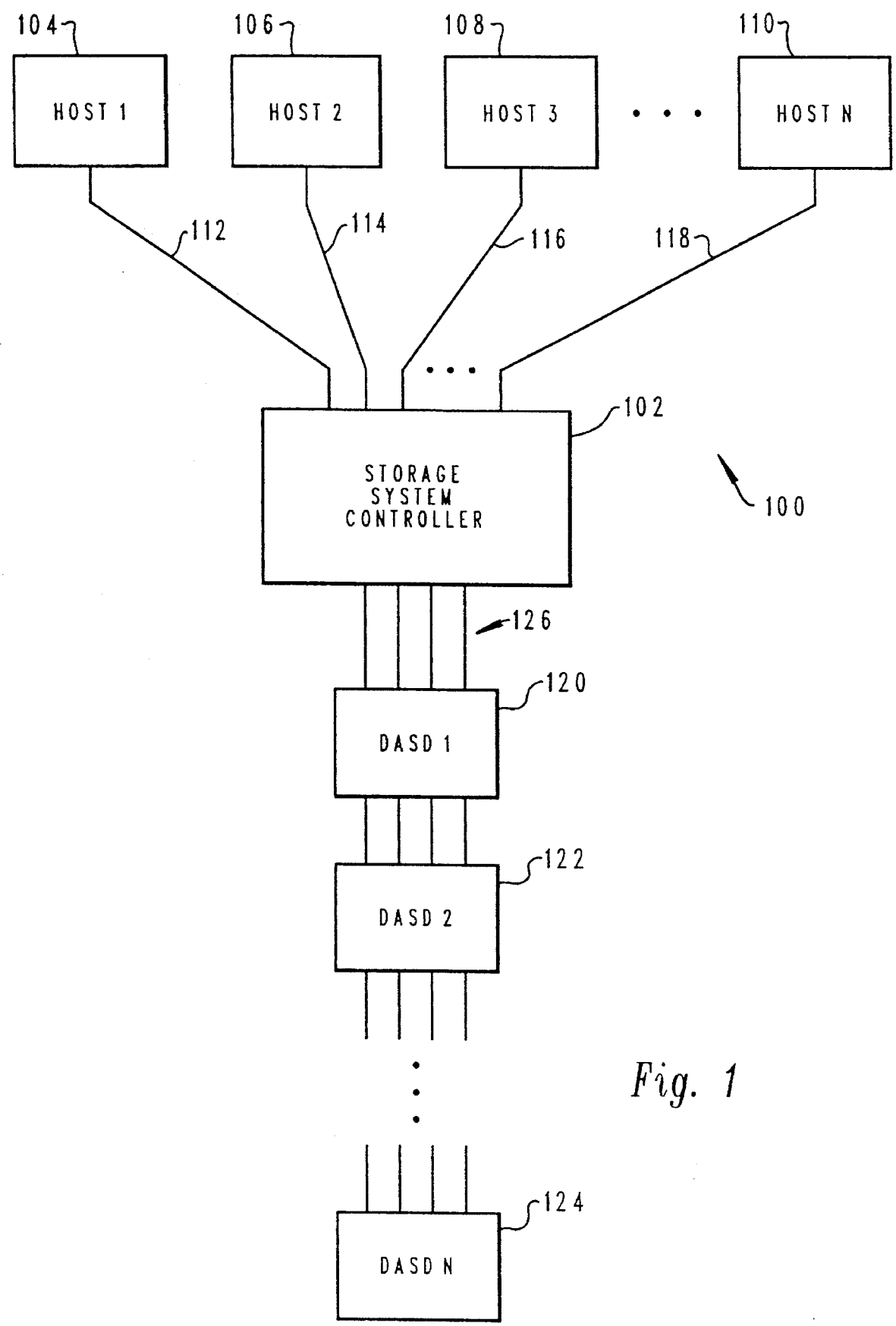
FIG. 1 depicts in accordance with a preferred embodiment of the present invention a high level block diagram of a data processing system which may be utilized to implement the method and system of the present invention.

With reference now to the figures and in particular with reference to FIG. 1, there is depicted a high level block diagram of a data processing system 100. Data processing system 100 includes a storage system controller 102. One example of such a storage system controller is the "3990 Model 3 Storage Control" available from International Business Machines Corporation. Storage system controller 102 is connected to host computers 104, 106, 108 and 110. Although only four host computers are depicted, data processing system 100 may include additional host computers. Host computers 104–110 are connected to storage system controller 102 by data channels 112, 114, 116 and 118. Data channels 112–118 are typically optical serial channels capable of transmitting data over distances up to 15 kilometers. One example of such an optical serial channel is "IBM Enterprise Systems Connection" (ESCON) available from International Business Machines Corporation. Storage system controller 102 is also connected to direct access storage devices 120, 122 and 124. Although only three direct access storage devices are depicted, sixty-four (64) direct access storage devices may be included in data processing system 100. Storage system controller 102 provides a common interconnection 126 between storage system controller 102 and each direct access storage device 120–124.

Figure 2:
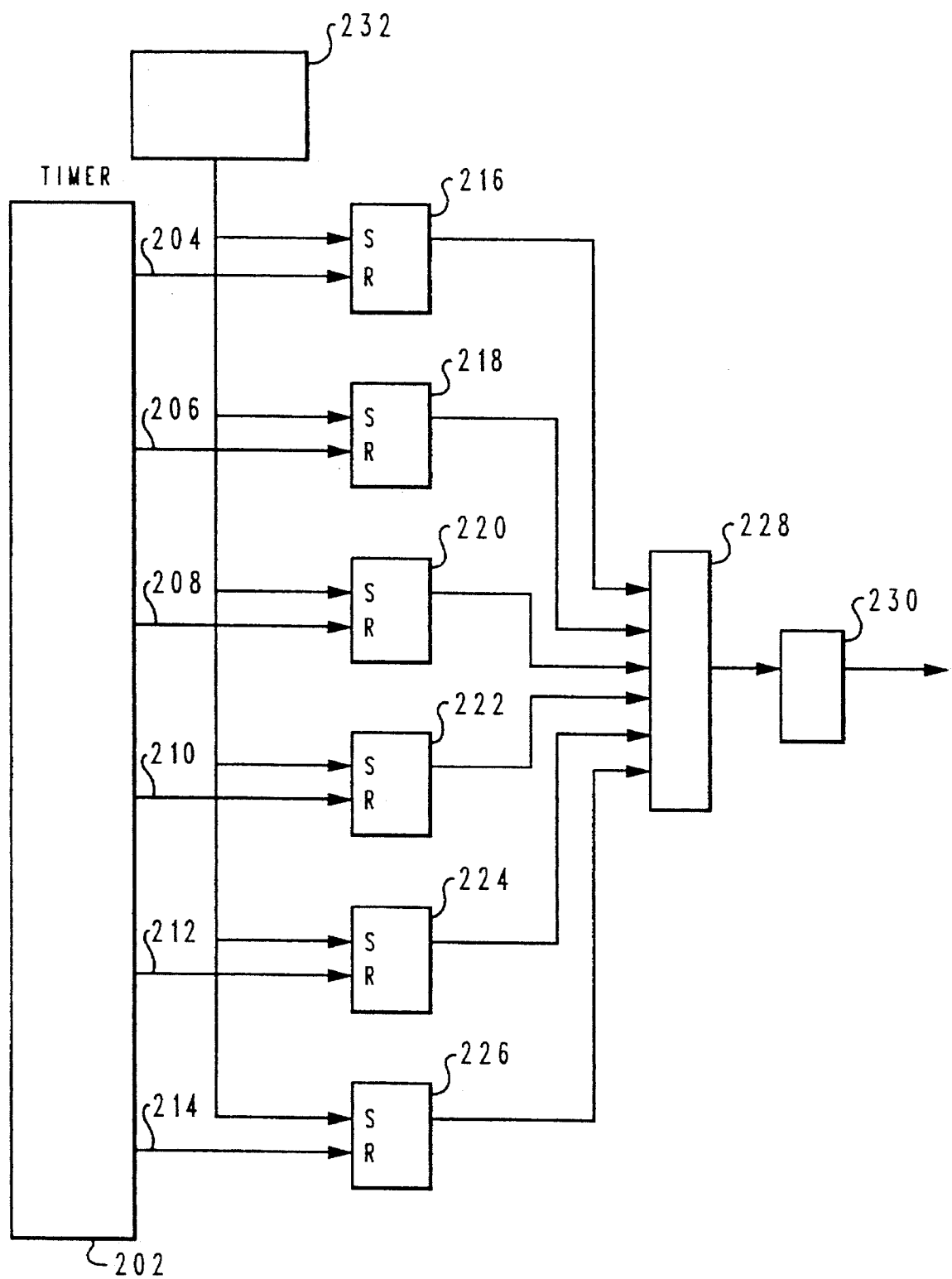
FIG. 2 is a block diagram illustrating a circuit which may be utilized to implement the method and system of the present invention.

FIG. 2 illustrates a block diagram of a logic circuit for calculating a final control word used to prohibit retransmission of unnecessary messages to a host computer. Logic circuit 200 contains a single timer 202 having multiple intermediate timer outputs 204, 206, 208, 210, 212 and 214. Intermediate timer outputs 204–214 are connected to storage locations 216, 218, 220, 222, 224 and 226. Storage locations 216–226 are connected to "OR" gate 228. OR gate 228 is connected to storage location 230, which stores the final control word. Send message detector 232 produces an output signal upon detection of a specific message sent to a host computer.

Signals provided by intermediate timer outputs 204–214 occur one at a time and typically at regular intervals. Signals produced by intermediate outputs 204–214 are sequential and continuously cycling. For example, a signal produced by intermediate timer output 204 begins the cycle and the cycle continues through intermediate timer outputs 206, 208, 210 and 212, until intermediate timer output 214 produces a signal. After intermediate timer output 214 produces a signal, the cycle wraps around and intermediate timer output 204 produces the next signal. This cycle continues indefinitely.

Although six intermediate timer outputs 204–214 are shown here, one skilled the art will appreciate that the timer design may comprise less than or more than six intermediate timer outputs. Varying the number of intermediate timer outputs changes the resolution or precision of the timer function. Utilizing a higher resolution allows storage system controller transmissions to be timed more precisely.

Each time intermediate timer outputs 204–214 produce a signal, the associated preliminary control words stored in storage locations 216–226 are completely cleared. The preliminary control words stored in storage locations 216–226 each contain multiple channel data bits that each correspond to a communication channel, such as data channels 112–118, used for communicating with a host computer. Each time send message detector 232 detects transmission of a specific message to a particular host, such as host computer 104 via communication channel 112, the corresponding channel data bit in every preliminary control word in every storage location 216–226 is set. Such channel data bits in the preliminary control words will thereafter remain set until such time as signals from intermediate timer outputs 204–214 respectively clear the entire associated preliminary control word.

Next, the preliminary control words stored in storage locations 216–226 are logically "ORed" together at OR gate 228. OR gate 228 calculates a final control word which is stored at storage location 230. Like the preliminary control words, the final control word also contains a channel data bit corresponding to each serial channel between storage system controller 102 and the connected host computers 104–110. If the channel data bit in the final control word corresponding to one of communication channels 112–118 is set, then storage system controller 102 will be prohibited from retransmitting the specific message over that particular communication channel until that particular channel data bit is cleared. Because intermediate timer outputs 204–214 are continuously and cyclicly producing signals which clear channel data bits in the preliminary control words stored in storage locations 216–226, the corresponding channel data bit in the final control word will eventually be cleared and retransmission of the specific message to the same host will be permitted.

Figure 3:
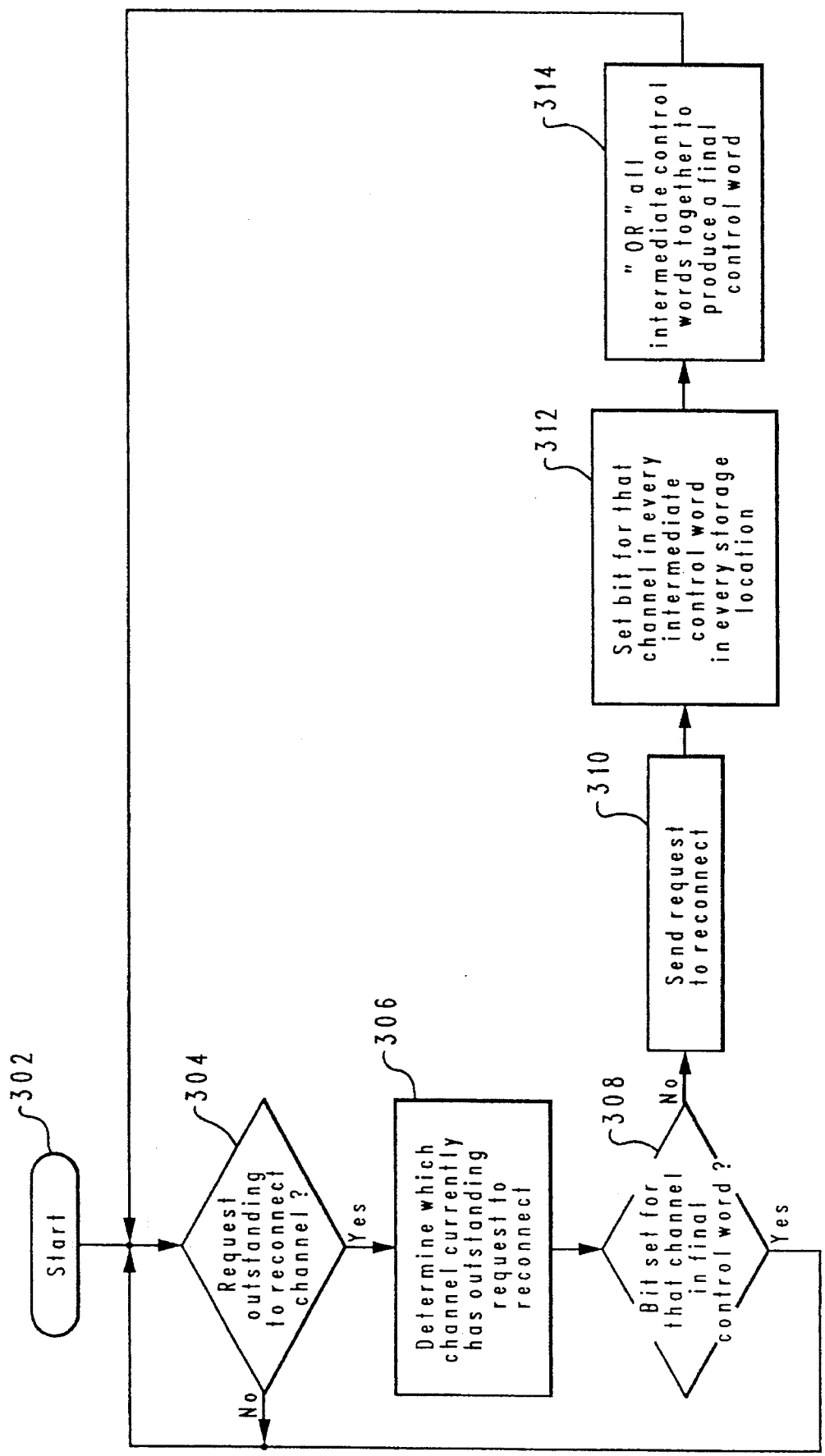
FIG. 3 is a logical flowchart depicting a process of prohibiting retransmission of a specific message for a predetermined minimum period of time according to the method and system of the present invention.

Referring now to FIG. 3, there is depicted a high level logical flowchart of a process for implementing the method and system of the invention, executable within storage system controller 102 of FIG. 1. Terminal block 302 illustrates the starting point at which storage system controller 102 begins normal operation. In normal operation, and as depicted at decision block 304, storage system controller 102 continuously monitors attempts by storage system controller 102 to send a specific message, such as a request to reconnect channel, to any one of the connected host computer systems 104–110. If storage system controller 102 detects an outstanding attempt to send the specific message, the process, as illustrated at process block 306, determines which channel currently has an outstanding attempt to send the specific message. If there is not an outstanding attempt to send the specific message utilizing serial channels 112–118, the process continuously monitors storage system controller 102, until detecting an attempt to send the specific message, as depicted at the 'no' branch from decision block 304.

After the process determines which channel currently has an outstanding attempt to send the specific message, as depicted at block 306, the process then determines whether or not the channel data bit corresponding to that particular channel in the final control word is set, as depicted at decision block 308. If the channel data bit is set, the process iterates, as illustrated at decision block 308, until the appropriate channel data bit is cleared. If the channel data bit is not set, the process sends the specific message to a particular host computer, as illustrated at process block 310. If the channel data bit is not set, this serves as an indication that sufficient time has elapsed since the last transmission of the specific message to permit retransmission of the specific message. After sending the specific message, the process sets the channel data bit in every preliminary control word in every storage location 216–226 corresponding to the channel from which the specific message was sent, as depicted at process block 312. Next, the process calculates a final control word by "ORing" all preliminary control words together, as illustrated at process block 314. After calculating the final control word as described above, the process returns to block 304 in an iterative fashion to await a current outstanding attempt to send the specific message.

Figure 4:
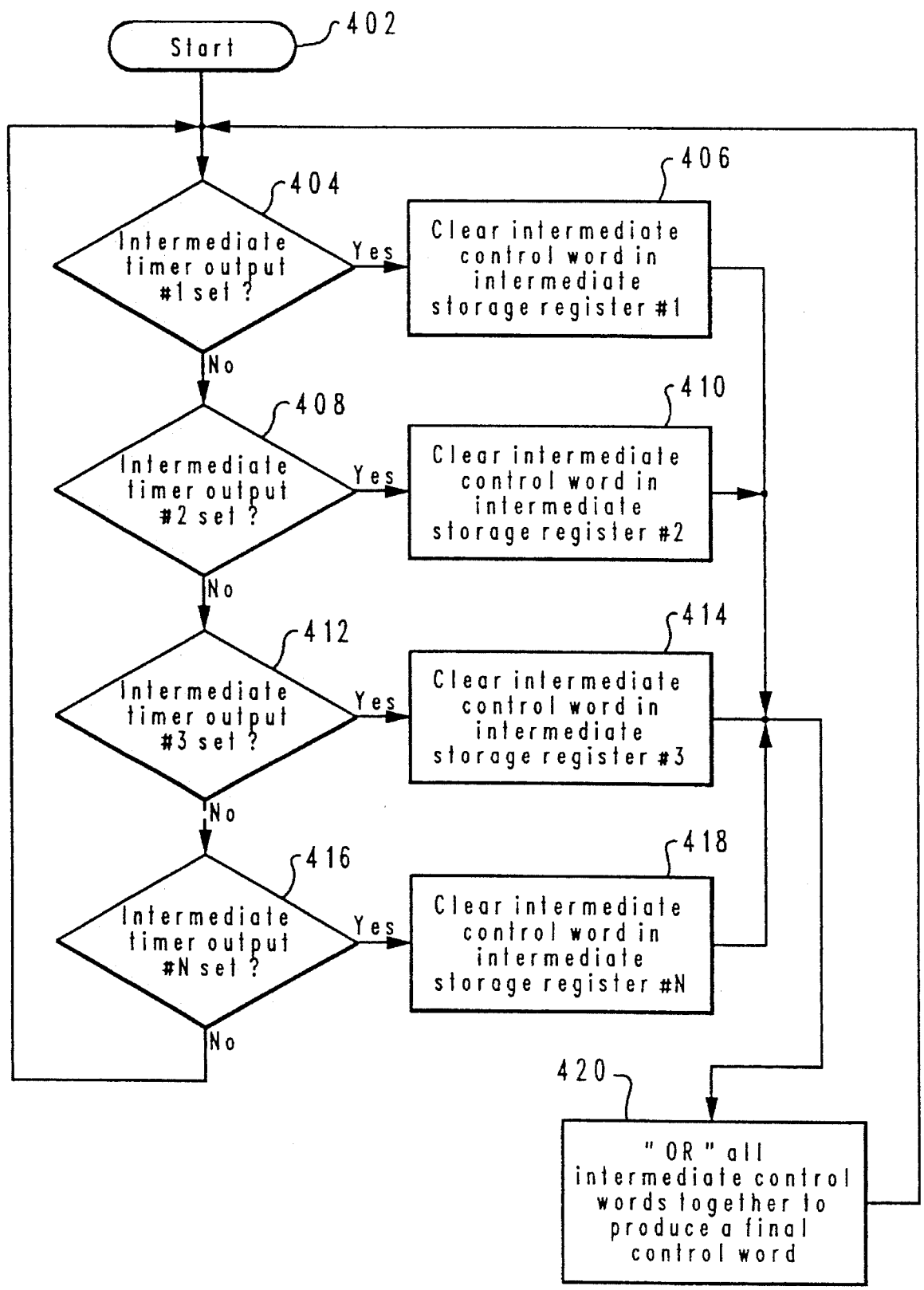
FIG. 4 is a logical flowchart illustrating a process of updating an N-bit final control word in a timer according to the method and system of the present invention.

Finally, with reference to FIG. 4, there is depicted a high level logical flow chart for implementing the method and system of the invention, as executed within storage system controller 102 of FIG. 1. The process depicted by the flowchart in FIG. 4 operates concurrently with the process illustrated in FIG. 3. Terminal block 402 depicts the entry point at which normal process flow begins. In normal process flow, intermediate timer outputs 204–214 are continuously monitored for an output signal, as depicted at decision blocks 404, 408, 412 and 416. FIG. 4 illustrates a process that monitors "N" intermediate timer outputs. In FIG. 2, six intermediate outputs are shown (204–214). However, it should be obvious to one skilled in the art that the number of intermediate timer outputs utilized may be greater than or less than six, as shown in FIG. 2. The number of intermediate timer outputs utilized determines the precision or the resolution of the timer function. Utilizing a greater number of intermediate timer outputs enables the process to keep track of time in smaller increments.

After the process determines whether or not intermediate timer outputs are set, the process clears the channel data bits in the preliminary control word in the associated storage location 216–226, as depicted at process blocks 406, 410, 414 and 418. For example, at a particular point in the process cycle, intermediate timer output 1 (for example, intermediate timer output 204 in FIG. 2) produces a signal that clears the channel data bits within the preliminary control word stored in storage location 216. Each storage location 216–226 is eventually cleared by the appropriate intermediate timer output signal.

After all channel data bits contained within the preliminary control words are cleared by an associated intermediate timer output, the process calculates a final control word by "ORing" all preliminary control words together, as illustrated at process block 420. After calculating a new final control word as depicted at process block 420, the process returns iteratively to block 404 to check for intermediate timer outputs. The process depicted in FIG. 4 then continues in an iterative fashion.

While the invention has been particularly shown and described with reference to a preferred embodiment, it will be understood by those skilled in the art that various changes in form and detail may be made therein without departing from the spirit and scope of the invention.

What is claimed is:

1. A system for enhancing the efficiency of communication between a plurality of host computers and a storage system controller, wherein each of said plurality of host computers is connected to said storage system controller via one or more communication channels, said system comprising:

a single timer means comprises a single timer having multiple intermediate time outputs;

detection means coupled to each of said communication channels for detecting a first transmission of a specific message from said storage system controller to a selected one of said plurality of host computers; and prohibition means coupled to each of said communications channels, said single timer means, and said detection means for prohibiting retransmission of said specific message from said storage system controller to said selected one of said plurality of host computers for a predetermined minimum period of time in response to a detection of said first transmission of said specific message, wherein said prohibition means comprises:

storage means for storing a preliminary control word having a channel data bit therein corresponding to each of said communication channels; and calculation means coupled to said storage means for calculating a final control word having an independent channel data bit therein corresponding to each of said communication channels, said independent channel data bit controlling whether or not said specific message may be retransmitted to said selected one of said plurality of host computers wherein efficiency of communications is increased by eliminating unnecessary transmissions of said specific message.

2. The system for enhancing the efficiency of communication between a plurality of host computers and a storage system controller according to claim 1 wherein said communication channel comprises a high speed serial fiber optic cable.

3. The system for enhancing the efficiency of communication between a plurality of host computers and a storage system controller according to claim 2 wherein said timer means comprises six intermediate timer outputs.

4. A system for enhancing the efficiency of communication between a plurality of host computers and a storage system controller, wherein each of said plurality of host computers is connected to said storage system controller via one or more communication channels, said system comprising:

timer means for producing multiple sequential intermediate timer outputs;

detection means coupled to each of said communication channels for detecting a first transmission of a specific message from said storage system controller to a selected one of said plurality of host computers;

storage means coupled to said detection means and each of said multiple sequential intermediate timer outputs for storing a plurality of preliminary control words having a channel data bit therein corresponding to each of said communication channels in response to said detection of said first transmission of said specific message and said multiple sequential intermediate timer outputs;

modification means coupled to said storage means for periodically modifying each of said plurality of preliminary control words in response to said multiple sequential intermediate timer outputs;

calculation means coupled to said storage means for calculating a final control word having an independent channel data bit therein corresponding to each of said communication channels, said independent channel data bit controlling whether or not said specific message may be retransmitted to said selected one of said plurality of host computers; and prohibition means coupled to said storage means for prohibiting retransmission of said specific message from said storage system controller to said selected one of said plurality of host computers for a predetermined minimum period of time in response to a state of said plurality of preliminary control words, wherein efficiency of communications is increased by eliminating unnecessary transmissions of said specific message.

5. A method for enhancing the efficiency of communication between a plurality of host computers and a storage system controller, wherein each of said plurality of host computers is connected to said storage system controller via one or more communication channels, said method comprising the steps of:

producing multiple sequential intermediate timer outputs from a single timer;

detecting a transmission of a specific message from said storage system controller to a selected one of said plurality of host computers via one of said plurality of communication channels;

storing a plurality of preliminary control words having a channel data bit therein corresponding to each of said communication channels in response to detection of said transmission of said specific message;

modifying said plurality of preliminary control words in response to said multiple sequential intermediate timer outputs;

calculating a final control word having an independent channel data bit therein corresponding to each of said communication channels, said independent channel data bit controlling whether or not said specific message may be retransmitted to said selected one of said plurality of host computers; and prohibiting retransmission of said specific message from said storage system controller to said selected one of said plurality of host computers in response to a state of said plurality of preliminary control words, wherein efficiency of communications is increased by eliminating unnecessary transmissions of said specific message.

* * * * *